United States Patent
Bauman et al.

(10) Patent No.: US 6,562,165 B1
(45) Date of Patent: May 13, 2003

(54) METHOD FOR LAMINATING CLOSURE MEMBER TO FILM WEB

(75) Inventors: Karl W. Bauman, Midland County, MI (US); James C Pawloski, Bay County, MI (US)

(73) Assignee: S.C. Johnson Home Storage, Inc., Racine, WI (US)

( * ) Notice: Subject to any disclaimer, the term of this patent is extended or adjusted under 35 U.S.C. 154(b) by 192 days.

(21) Appl. No.: 09/640,402

(22) Filed: Aug. 15, 2000

(51) Int. Cl.$^7$ ............................................. A44B 19/00
(52) U.S. Cl. .................. 156/66; 156/244.11; 156/297; 156/555; 383/61.1; 383/61.2; 383/61.3; 383/97; 383/205; 383/63; 53/139.2; 24/585.12
(58) Field of Search ................ 156/66, 244.11, 156/244.22, 244.27, 297, 500, 299, 302, 303, 555; 53/416, 451, 139.2; 383/61.1, 61.2, 61.3, 63, 68, 97, FOR 100, 204, 205, 210.1; 493/214, 264, 293, 297, 331, 334; 428/34.3; 24/585.12

(56) References Cited

U.S. PATENT DOCUMENTS

| | | |
|---|---|---|
| 2,643,049 A | 6/1953 | Bartelt |
| 3,181,583 A | 5/1965 | Lingenfelter |
| 3,226,787 A | 1/1966 | Ausnit |
| 3,283,672 A | 11/1966 | Mueller |
| 3,338,284 A | 8/1967 | Ausnit |
| 3,462,332 A | 8/1969 | Goto |
| 3,846,209 A | 11/1974 | Howard |
| 3,852,386 A | 12/1974 | Behr |
| 3,904,468 A | 9/1975 | Noguchi |
| 4,101,355 A | 7/1978 | Ausnit |
| 4,279,677 A | 7/1981 | Takahashi |
| 4,295,915 A | 10/1981 | Sakaguchi et al. |
| 4,306,924 A | 12/1981 | Kamp |
| 4,341,575 A | 7/1982 | Herz |
| 4,355,494 A | 10/1982 | Tilman ............... 53/416 |
| 4,428,788 A | 1/1984 | Kamp |
| 4,522,678 A | 6/1985 | Zieke |
| 4,555,282 A | 11/1985 | Yano |
| 4,582,549 A | 4/1986 | Ferrell |
| 4,601,694 A | 7/1986 | Ausnit ............... 493/381 |
| 4,691,372 A | 9/1987 | Van Erden ............... 383/63 |
| 4,691,373 A * | 9/1987 | Ausnit ............... 383/63 |
| 4,755,248 A | 7/1988 | Geiger et al. |
| 4,756,629 A | 7/1988 | Tilman et al. ............... 383/63 |
| 4,812,056 A | 3/1989 | Zieke |
| 5,335,997 A | 8/1994 | Kanemitsu et al. |
| 5,405,561 A | 4/1995 | Dais et al. |
| 5,749,658 A | 5/1998 | Kettner |
| 5,827,163 A | 10/1998 | Kettner |
| 6,110,586 A | 8/2000 | Johnson |

FOREIGN PATENT DOCUMENTS

| | | | |
|---|---|---|---|
| GB | 826795 | 1/1960 | ............... 42/1 |
| GB | 1546433 | 5/1979 | ............... 33/24 |

* cited by examiner

*Primary Examiner*—Michael W. Ball
*Assistant Examiner*—Jessica Rossi (57) ABSTRACT

Methods for forming a thermoplastic film with an attached closure strip are disclosed. The thermoplastic film can then be used to produce zippered reclosable plastic bags. The methods include providing a thermoplastic film web having a sealing surface and providing a closure strip having a binding surface, both being maintained in a non-melted condition at room temperature. A heated thermoplastic binder layer is then extruded and positioned between the sealing surface of the film web and the binding surface of the closure strip very quickly after extrusion. The hot freshly extruded binder layer transfers enough heat to the closure strip and to the film web to melt the binding surface of the closure strip and sealing surface of the film web. Pressure is then applied to the film web and the closure strip to seal the closure strip to the film web. An apparatus for practicing the method at high speed is also disclosed.

5 Claims, 5 Drawing Sheets

METHOD FOR LAMINATING CLOSURE MEMBER TO FILM WEB

CROSS-REFERENCE TO RELATED APPLICATIONS

Not Applicable

STATEMENT REGARDING FEDERALLY SPONSORED RESEARCH/DEVELOPMENT

Not Applicable

BACKGROUND OF THE INVENTION

The present invention relates to methods for attaching closure members, i.e., a zipper tape, to a plastic film web. It appears especially well suited for laminating zipper elements to plastic storage bags so as to form reclosable storage bags.

The prior art has developed reclosable plastic storage bags for use in protecting food items and for other storage purposes. A film of a plastic such as polyethylene is provided with a closure member (one half of a zipper) on its opposed ends. The film is then folded to bring the zipper halves adjacent to each other, with the sides of the bag then being heat sealed. The bag can then be opened or closed in the usual manner by interlocking the zipper elements.

One difficulty experienced by manufacturers of reclosable plastic storage bags involves the joining of the closure members to the bag film web portion. Care must be taken to ensure that the closure members are positioned properly on the bag film web. Further, there should be no wrinkles or creases in the area of the bag in which the fastener profiles and bag film web are joined.

A variety of methods are known for attaching closure members to a plastic film web prior to forming reclosable plastic storage bags. One approach has been to form the bag film web and the closure members in a single extrusion operation. See e.g. U.S. Pat. Nos. 3,338,284 and 3,852,386. The disclosure of these publications and of all other publications referred to herein are incorporated by reference as if fully set forth herein.

A second approach utilizes an adhesive, such as a strip of tape or glue, to join a closure member to a bag film web. For example, U.S. Pat. No. 4,101,355 discloses a reclosable bag film forming process wherein a web and closure member are joined by a liquid adhesive which is supplied by an applicator having a nozzle. After the adhesive is applied, the web and closure members are pressed together by a presser roll and a backing roll. See also U.S. Pat. Nos. 4,341,575 and 3,226,787.

A third approach involves the use of a pre-formed bag film web and a pre-formed closure member which are drawn from separate stock rolls. The bag film web and/or closure member are then heated and joined. For example, U.S. Pat. No. 3,846,209 discloses a method for producing a closure member-containing bag film wherein a pre-formed plastic film is fed from a stock roll into a sealing station. A separate closure strip from a second stock roll is also fed into the sealing station. In the sealing station, the closure strip and plastic film are welded together by a pair of heating bars.

A fourth approach uses a pre-formed bag film web drawn from a supply roll and then joined to a relatively freshly extruded closure member. For example, U.S. Pat. No. 3,904,468 discloses a method of making a reclosable bag film wherein a web of bag film material is unwound from a stock roll and then transferred to a heating station having a heating roll on which the film is heated to a desired temperature. The film is then transferred to a heated joining roll wherein the film is joined to the freshly extruded fastener profile strips. See also U.S. Pat. Nos. 4,279,677 and 4,582,549.

Another variation on this fourth approach is disclosed in U.S. Pat. No. 4,555,282 which discloses a method of bonding a closure member to a bag film web wherein a closure member having a base portion and a fastener profile portion is extruded shortly before being bonded to a bag film web. Intermediate the extrusion of the closure member and its joinder to the bag film web, the fastener profile portion of the closure member is cooled (and thereby solidified and stabilized) while the base portion is left heated (and thereby remains thermoplastic) when the closure member is joined to the film.

U.S. Pat. No. 4,306,924 discloses another variation on this fourth approach wherein the film web is extruded on to a casting roll to join an already formed closure member.

A fifth approach involves the extrusion of a bag film web and a closure member in close proximity to each other, and the joinder of the bag film web and closure member to each other shortly after extrusion. For example, U.S. Pat. No. 4,428,788 discloses a method for forming a reclosable bag wherein a film, a tape, and a closure member are extruded by three separate dies. The film, tape and closure member dies are positioned so that the film, tape and closure members contact each other while still at a temperature of above 200° F. A chill roll is provided for cooling the film, tape and closure members.

U.S. Pat. No. 4,295,915 discloses an apparatus for forming a reclosable bag film wherein a fastener profile and its base strip are extruded integrally, and then joined to a film web. The die for extruding the bag film web is disposed adjacent to the fastener die block so that the fastener profile and bag film are joined shortly after both are extruded. See also U.S. Pat. Nos. 3,462,332 and 4,522,678.

A sixth approach involves the extrusion of a bag film web having a relatively thinner first portion and a relatively thicker second portion, and the separate extrusion of male and female fastener profiles that are joined to the thicker second portions before the thicker second portions have cooled. An example of this approach is found in U.S. Pat. No. 4,755,248.

A seventh approach involves attaching a closure member for a storage bag to the bag via an intermediate heat setting adhesive. See eg. U.S. Pat. Nos. 5,749,658 and 5,827,163.

However, to keep the costs of producing such bags to the minimum it is desirable to use high speed equipment to form these bags. Prior methods may not achieve a consistent seal between the closure members and the film web (and may introduce tension differences across the film web) when run at a very high speed. In addition, room for improvement exists in the fabrication of a reclosable bag which can be manufactured to consistently high quality standards.

There is therefore still a need for improved methods of attaching closure elements to plastic film such as that used in forming reclosable storage bags.

BRIEF SUMMARY OF THE INVENTION

The invention provides methods for forming a thermoplastic film having a closure strip. In one method, one provides a thermoplastic film web having a sealing surface, the temperature of the film web being below a melting temperature of the film web. One also provides a thermoplastic closure strip having a binding surface, the temperature of the closure strip being below a melting temperature of the closure strip.

One extrudes a thermoplastic binder layer, and then positions the binder layer between the sealing surface of the film web and the binding surface of the closure strip. The binder layer contacts the sealing surface of the film web before the binder layer has cooled to a temperature below the melting temperature of the film web and the binder layer also contacts the binding surface of the closure strip before the binder layer has cooled to a temperature below the melting temperature of the closure strip. Pressure applied to the film web and the closure strip binds the closure strip and film web to the binder layer.

In preferred forms there can be multiple closure strips (such as interlockable male and female strips), multiple binder layers (one binding each of the strips to the web), and the invention can be practiced on a folded web at opposite ends of the web.

In another aspect there is a first cylindrical roller having a surface and an axis of rotation and a second cylindrical roller having a surface and an axis of rotation, the axis of the first roller and the axis of the second roller being substantially coplanar, the first roller and the second roller being aligned in spaced apart relationship such that a pinch area is formed between the surface of the first roller and the surface of the second roller.

One feeds a continuous length of a thermoplastic film web having a sealing surface, such that the film web wraps on the surface of the first roller, while the temperature of the film web is below a melting temperature of the film web; and feeds a continuous length of a thermoplastic closure strip having a binding surface such that the closure strip wraps on the surface of the second roller, while the temperature of the closure strip is below a melting temperature of the closure strip.

One extrudes a thermoplastic binder layer, positions the binder layer between the sealing surface of the film web and the binding surface of the closure strip, and feeds the film web, binder layer and closure strip through the pinch area such that the binder layer contacts the sealing surface of the film web before the binder layer has cooled to a temperature below the melting temperature of the film web. The binder layer contacts the binding surface of the closure strip before the binder layer has cooled to a temperature below the melting temperature of the closure strip.

In another method one forms a folded thermoplastic film having a female closure strip and a male closure strip at opposed ends of the film. One step is to provide a first cylindrical roller having a surface and an axis of rotation and a second cylindrical roller having a surface and an axis of rotation, the axis of the first roller and the axis of the second roller being substantially coplanar, the first roller and the second roller being aligned in spaced apart relationship such that a first pinch area is formed between the surface of the first roller and the surface of the second roller.

Another step is to provide a third cylindrical roller having a surface and an axis of rotation and a fourth cylindrical roller having a surface and an axis of rotation, the axis of the third roller and the axis of the fourth roller being substantially coplanar, the third roller and the fourth roller being aligned in spaced apart relationship such that a second pinch area is formed between the surface of the third roller and the surface of the fourth roller.

One then feeds a continuous length of a folded thermoplastic film web having a first sealing surface on a first edge spaced apart from a fold line of the film web and a second sealing surface on a second edge spaced apart from the fold line of the film web such that the first edge of the film web wraps on the surface of the first roller and the second edge of the film web wraps on the surface of the third roller, while the temperature of the film web is below a melting temperature of the film web. One also feeds a continuous length of a thermoplastic female closure strip having a binding surface, such that the female closure strip wraps on the surface of the second roller, while the temperature of the female closure strip is below a melting temperature of the female closure strip.

Another step is to extrude a first thermoplastic binder layer and then position the first binder layer between the first sealing surface of the film web and the binding surface of the female closure strip. One then feeds the film web and the female closure strip through the first pinch area such that the first binder layer contacts the first sealing surface of the film web before the first binder layer has cooled to a temperature below the melting temperature of the film web and the first binder layer contacts the binding surface of the female closure strip before the first binder layer has cooled to a temperature below the melting temperature of the female closure strip.

One also feeds a continuous length of a thermoplastic male closure strip having a binding surface, such that the male closure strip wraps on the surface of the fourth roller, while the temperature of the male closure strip is below a melting temperature of the male closure strip.

Another step is to extrude a second thermoplastic binder layer and position the second binder layer between the second sealing surface of the film web and the binding surface of the male closure strip. One then feeds the film web and the male closure strip through the second pinch area such that the second binder layer contacts the second sealing surface of the film web before the second binder layer has cooled to a temperature below the melting temperature of the film web and the second binder layer contacts the binding surface of the male closure strip before the second binder layer has cooled to a temperature below the melting temperature of the male closure strip.

In another aspect the invention provides an apparatus for forming a thermoplastic film having a closure strip. There is a cylindrical lamination roller having a surface and an axis of rotation. There is also a cylindrical lay-on roller having a surface and an axis of rotation. The axis of the lamination roller and the axis of the lay-on roller are substantially coplanar, and the lamination roller and the lay-on roller are aligned in spaced apart relationship such that a pinch area is formed between the surface of the lamination roller and the surface of the lay-on roller.

There is also a web feed roller for feeding a continuous length of a thermoplastic film web having a sealing surface, the web feed roller being positioned such that the film web can wrap on the surface of the lamination roller after leaving the web feed roller. Another element is a closure strip feed roller for feeding a continuous length of a thermoplastic closure strip having a binding surface, the closure strip feed roller being positioned such that a closure strip can wrap on the surface of the lay-on roller.

An extruder can extrude a heated thermoplastic binder layer, the extruder including a die block with an opening, and the extruder being positioned such that the opening in the die block is adjacent the pinch area so as to be suitable to direct a heated binder layer between a nonheated closure strip and a nonheated film web.

The above methods and equipment permit the production of film webs with closure members assembled thereon at very high speeds (e.g. about 200 linear feet per minute). When the methods are used to form bags, the seal between the bag and zipper will be highly reliable and consistently formed (thus permitting an airtight structure).

Particularly preferred thermoplastics for the film web are low or high density polyethylene, linear low density polyethylene, polypropylene, nylon, and interpolymers of ethylene and one or more monomers copolymerizable therewith.

It is particularly preferred to have the closure members formed from the same thermoplastic as the film web. However, this is not essential. It is also preferred that the binder layer be formed from the same thermoplastic as the film web. However, this is also not essential.

It is particularly important that the binder layer thickness be sufficiently great so as to carry enough heat to create a melted region adjacent the binder layer when the binder layer contacts the closure members and the film web. At the same time, the binder layer should be sufficiently thin so as to create a stable cooled structure in under a second after the binder layer is pressed between a closure member and the film web.

It is an advantage of the present invention to provide a rapid method for attaching prefabricated thermoplastic closure members to prefabricated thermoplastic film webs traveling at high speeds.

This and still other advantages of the present invention will be apparent from the description of the preferred embodiments which follow.

DETAILED DESCRIPTION OF THE INVENTION

Figure 1:
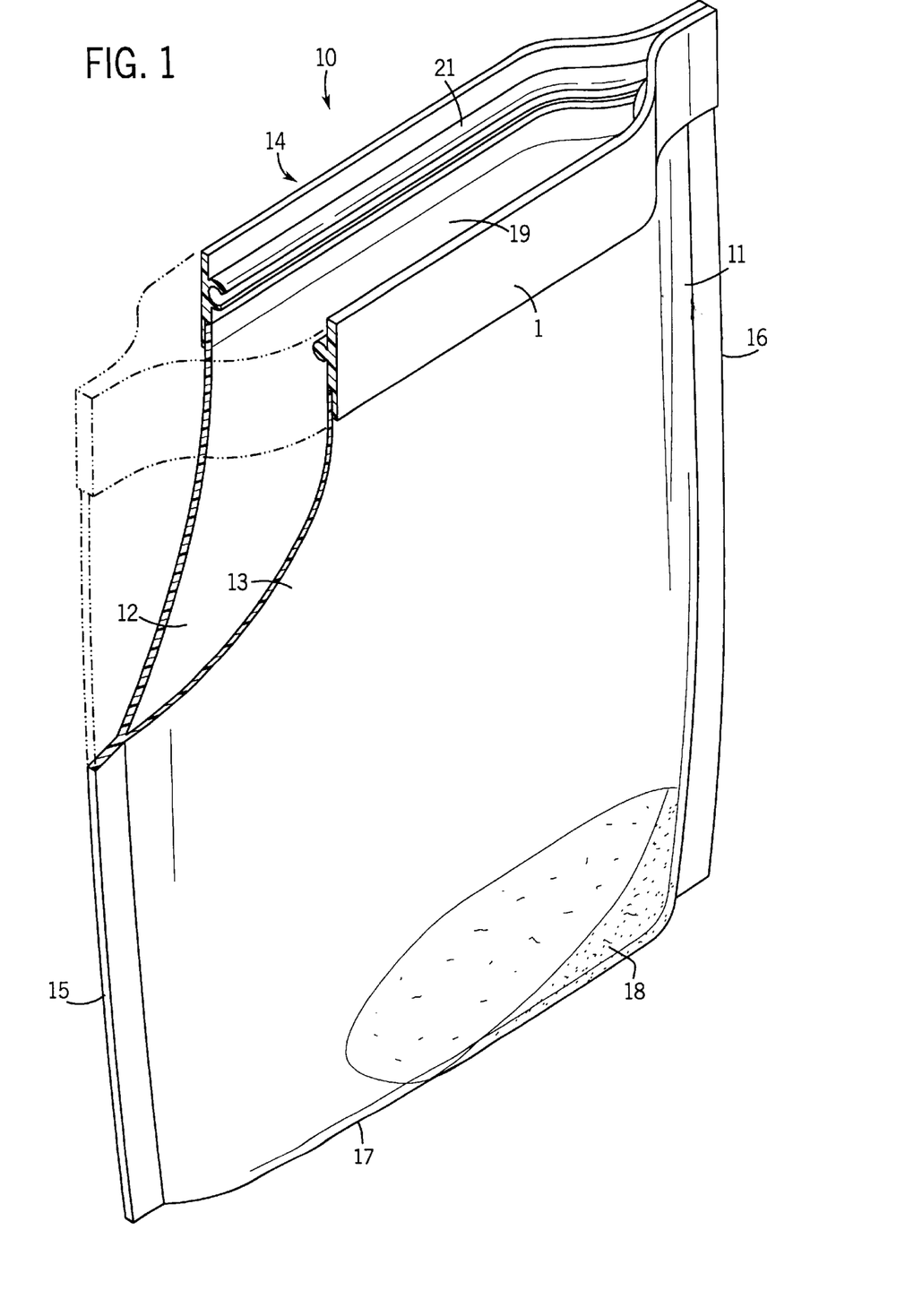
FIG. 1 is a perspective view of a reclosable plastic bag made in accordance with the present invention.

Flexible bag 10 is made of first and second opposed panel sections 12, 13 from a polymeric film. The sections are heat sealed together along a pair of side edges 15, 16, and a bottom edge 17 in order to form a pocket 19 within the interior of the bag 10. The pocket 19 may be used to hold a product 18, such as a variety of "left over" edible food substances, or non-edible products. Access to the interior of the bag 10 is provided through an opening 14.

Sections 12,13 may be made of any thermoplastic resin capable of forming a flexible film. Specific thermoplastic resinous films are chosen to provide adequate tensile strength, tear strength, pressure resistance, impact strength, and the like, for the end use desired, at minimal cost for the selected use. Low or high density polyethylene, linear low density polyethylene, polypropylene, nylon, and interpolymers of ethylene and one or more monomers copolymerizable therewith are typically preferred. Suitable thicknesses generally fall within the range of 0.025 mm to 0.254 mm, preferably from about 0.038 mm to about 0.114 mm. The film can be formed from a single layer of thermoplastic resin or it may be formed as a multilayer structure.

Flexible bag 10 includes a zipper type closure 21 extending from side edge 15 to side edge 16. Female closure strip 20 includes an elongated inward profile 22 attached to or integrally formed with female closure strip 20, and the male closure strip 30 includes an elongated projecting profile 32 attached to or integrally formed with male closure strip 30. The inward profile 22 and the projecting profile 32 cooperate by snap interlocking to allow bag 10 to be opened and re-closed in the usual manner.

Figure 2:
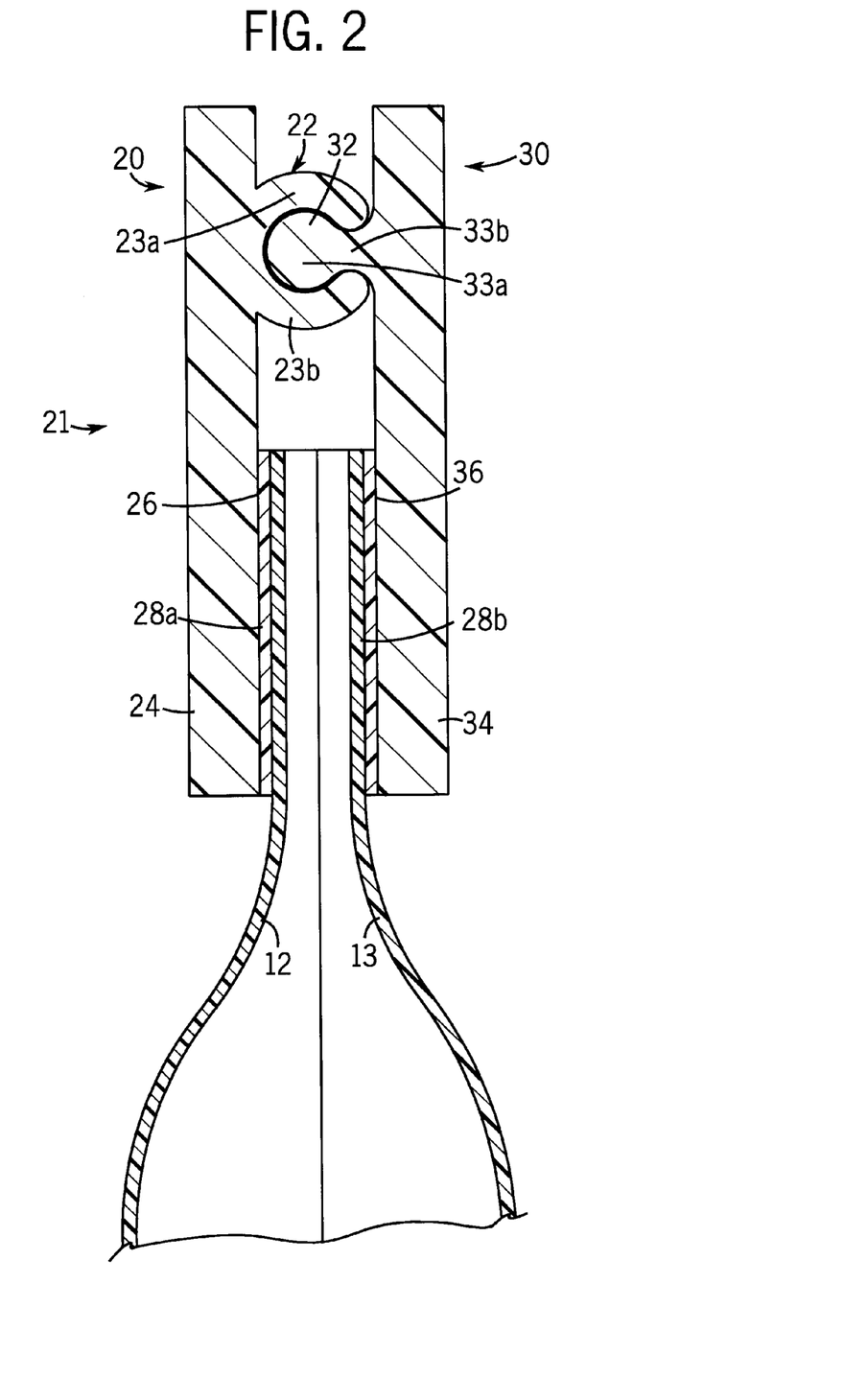
FIG. 2 is a partial cross sectional view of the closure arrangement of FIG. 1, albeit when the bag is closed.

As illustrated in FIG. 2, the projecting profile 32 has a cross section which is generally tree-shaped including an expanded head portion 33a and a narrower trunk portion 33b. The locking structure of the inward profile 22 includes first and second arcs 23a and 23b with a cross section which mechanically engage the head 33a of the male projecting 32 to re-close bag 10.

The female closure strip 20 also includes a flange portion 24, and the male closure strip 30 also includes a flange portion 34. The inner surface 26 of the flange portion 24 is configured for attachment to the panel 12 of the bag 10, and the inner surface 36 of the flange portion 34 is configured for attachment to the panel 13 of the bag 10. The zipper 21 is permanently attached to bag 10 by adhering the inner surface 26 of the flange portion 24 of the female closure strip 20 to the panel 12 via binder layer 28a, and adhering the inner surface 36 of the flange portion 34 of the male closure strip 30 to the panel 13 via binder layer 28b.

The female closure strip 20 and the male closure strip 30 of the zipper 21 can be made of any thermoplastic resin suitable for forming a reclosable bag zipper. Thermoplastic resins preferred for use in forming the zipper of the present invention include low or high density polyethylene, linear low density polyethylene, polypropylene, nylon, and interpolymers of ethylene and one or more monomers copolymerizable therewith.

Suitable thicknesses for the flange portion 24 of the female closure strip 20 and for the flange portion 34 of the male closure strip 30 generally fall within the range of from about 0.076 mm to 0.305 mm, preferably from about 0.152 mm to 0.229 mm. Again, the female closure strip 20 and the male closure strip 30 can be formed from a single layer of thermoplastic resin or they may be formed as a multilayer structure having a plurality of layers.

The binder layer 28a and the binder layer 28b may comprise any thermoplastic resin suitable for bonding the male and female closure members and the film used to form the opposed panel sections 12,13. Thermoplastic resins suitable for use in the binder layer 28a and the binder layer 28b of the present invention include low or high density polyethylene, linear low density polyethylene, polypropylene, nylon, and interpolymers of ethylene and one or more monomers copolymerizable therewith.

Suitable thicknesses for the binder layers 28a/28b generally fall within the range of about 0.025 mm to about 0.152 mm, preferably from about 0.025 mm to 0.102 mm. The binder layers can be formed from a single layer of thermoplastic resin or may be formed as a multilayer structure having a plurality of layers.

The width of the binder layer 28a and the binder layer 28b (as measured in a direction extending from the bottom edge 17 of the bag 10 toward the zipper 21) generally fall within the range of about 1.27 mm to 6.35 mm, preferably from about 3.175 mm to 4.445 mm.

Figure 3:
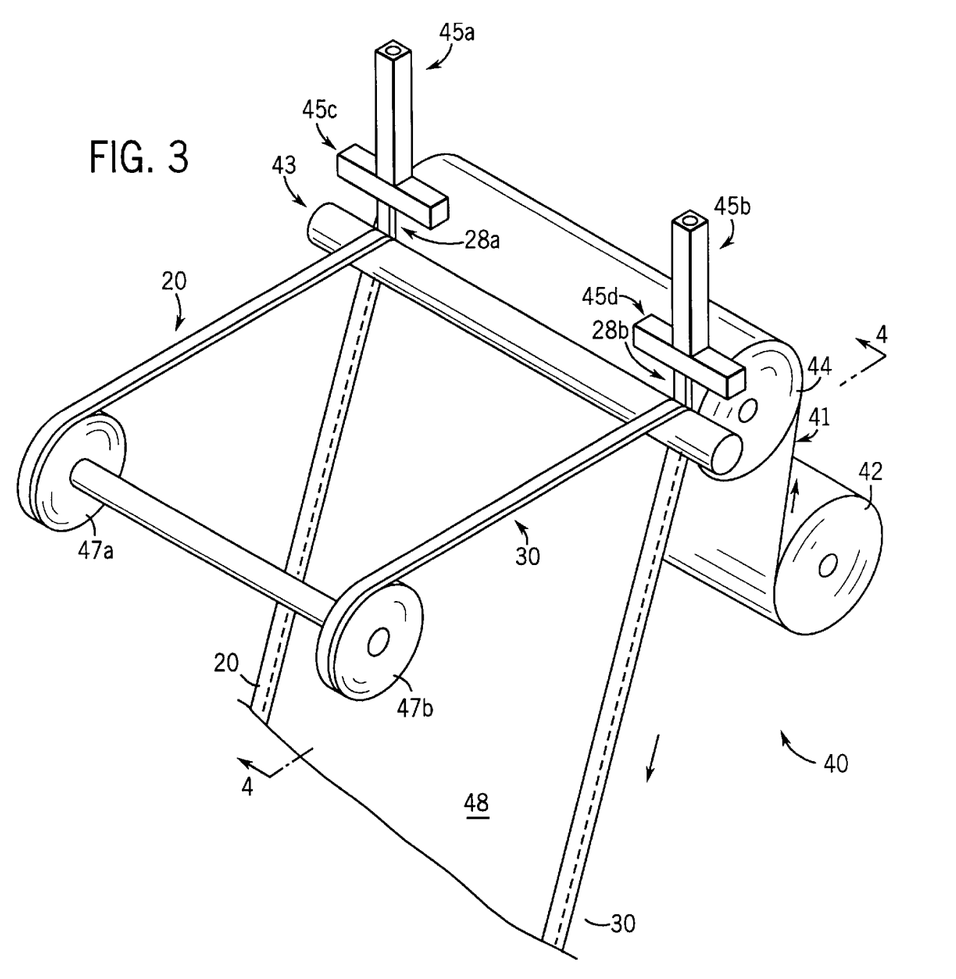
FIG. 3 is a perspective view of an apparatus in accordance with the invention.
Figure 4:
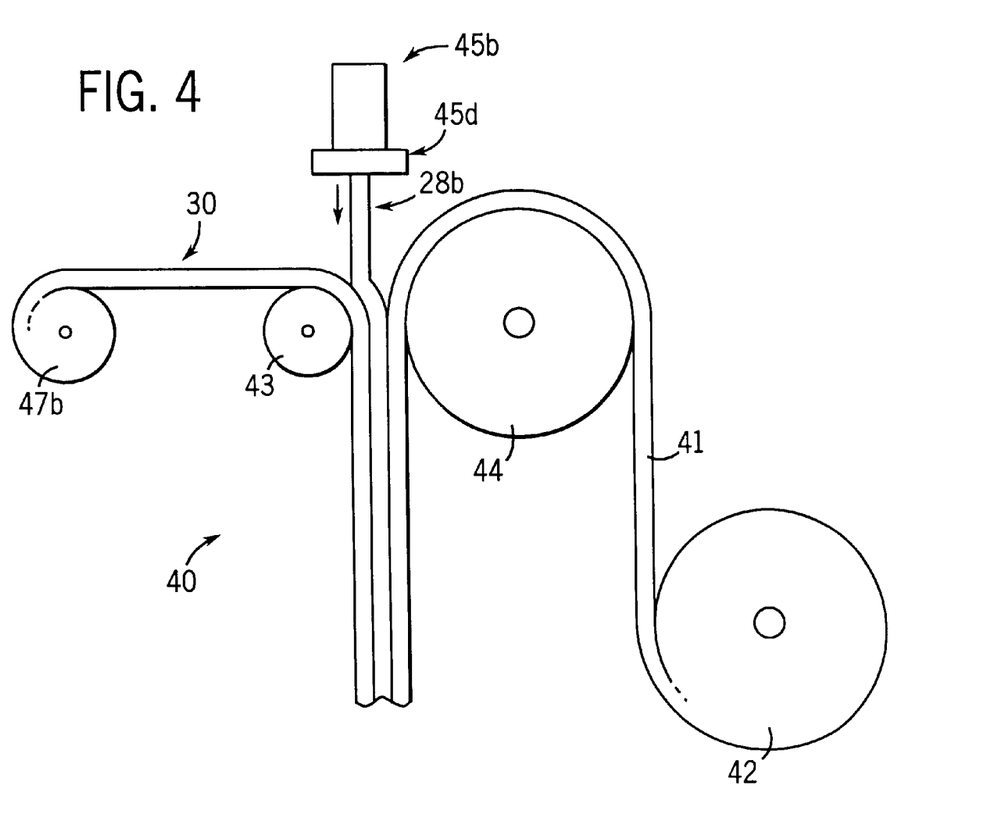
FIG. 4 is a side view of the apparatus of FIG. 3.

FIGS. 3 and 4 show an apparatus that may be used to manufacture a bag film with closure members (one half of a zipper) on its opposed ends. The bag film can then be folded to bring the zipper halves adjacent to each other and heat sealed along the side edges to form a reclosable bag 10.

Lamination apparatus 40 includes a bag film supply roll 42 for supplying a bag film web 41 wound into a roll, a female closure strip supply roll 47a for supplying the female closure strip 20, a male closure strip supply roll 47b for supplying the male closure strip 30, a binder layer extruder 45a for supplying the binder layer 28a, a binder layer extruder 45b for supplying binder layer 28b, and a lamination roller 44 and a lay-on roller 43 which cooperate to squeeze binder layer 28a between one edge of bag film web 41 and the inner surface 26 of the flange portion 24 of the female closure strip 20 and to squeeze binder layer 28b between an opposite edge of bag film web 41 and the inner surface 36 of the flange portion 34 of the male closure strip 30.

The binder layer extruders 45a and 45b may include a hopper (not shown) for receiving plastic material, a body (not shown) which contains a heating means for heating the plastic material into a molten state, and a screw auger (not shown) for advancing the molten plastic material to and through die blocks 45c and 45d. The die blocks 45c and 45d include a die slot (not shown) configured such that the binder layers 28a and 28b extruded from the extruders 45a and 45b have a cross-sectional shape similar to the cross-sectional shape of the die slot.

The bag film web 41 is prefabricated using known techniques such as extrusion and is rolled up for storage on the bag film supply roll 42. The female closure strip 20 is also prefabricated using known techniques such as extrusion and is rolled up for storage on the female closure strip supply roll 47a. The male closure strip 30 is likewise prefabricated using known techniques such as extrusion and is rolled up for storage on the male closure strip supply roll 47b. The bag film web 41 is fed from the bag film supply roll 42 at a temperature that is below the melting temperature of the film web 41 (typically room temperature) and then wraps on the lamination roller 44 to stabilize the bag film web 41.

At the same time, the female closure strip 20 is fed from the female closure strip supply roll 47a at a temperature that is below the melting temperature of the female closure strip 20 (preferably room temperature) and the male closure strip 30 is fed from the male closure strip supply roll 47b at a temperature that is below the melting temperature of the male closure strip 30 (preferably room temperature). The female closure strip 20 and the male closure strip 30 then wrap opposite ends of the lay-on roller 43.

The binder layer extruders 45a and 45b are positioned in the apparatus 40 such that binder layers 28a and 28b are placed on the inner surface 26 of the flange portion 24 of the female closure strip 20 and the inner surface 36 of the flange portion 34 of the male closure strip 30 respectively just prior to the female closure strip 20 and the bag film web 41 being squeezed between the lay-on roller 43 and the lamination roller 44 and just prior to the male closure strip 30 and the bag film web 41 being squeezed between the lay on roller 43 and the lamination roller 44. During operation of the binder layer extruders 45a and 45b, the drawdown of the binder layers 28a and 28b is about 11.5 cm from a 1.9 cm width die.

The temperature of the binder layers 28a and 28b at the die blocks 45c and 45d is typically about 127° C. The binder layers 28a and 28b transfer enough heat to the flange portion 24 of the female closure strip 20 and the flange portion 34 of the male closure strip 30 respectively to melt a surface of flange portion 24 of the female closure strip 20 and a surface of flange portion 34 of the male closure strip 30. The binder layers 28a and 28b also transfer enough heat to the edges of the bag film web 41 to melt the edges of the bag film web 41.

It is particularly important that the binder layer thickness and width be sufficiently great so as to carry enough heat to create a melting surface adjacent the binding layers 28a and 28b. At the same time, the binding layers 28a and 28b must be sufficiently thin so as to create a stable cooled structure in a short period of time (typically under one second after the binding layers 28a and 28b contact the edges of the bag film web 41). Likewise, the die blocks 45c and 45d of the binder layer extruders 45a and 45b must be located sufficiently near the female closure strip 20, the male closure strip 30, and the edges of the bag film web 41 so that the binder layers 28a and 28b retain enough heat after moving away from the die blocks 45c and 45d such that the binder layers 28a and 28b melt the female closure strip 20, the male closure strip 30, and the edges of the bag film web 41.

The pressure applied by the lay-on roller 43 and the lamination roller 44 keeps the melted flange portion 24 of the female closure strip 20 in contact with the melted binder layer 28a and keeps the melted portion of the bag film web 41 in contact with the melted binder layer 28a at that point in the web path such that the female closure strip 20 is sealed to one longitudinal edge of the base film web 41 when the melted flange portion 24 of the female closure strip 20, the melted binder layer 28a and the melted portion of the bag film web 41 cool. Likewise, the pressure applied by the lay on roller 43 and the lamination roller 44 keeps the melted flange portion 34 of the male closure strip 30 in contact with the melted binder layer 28b and keeps the melted portion of the bag film web 41 in contact with the melted binder layer 28b at that point in the web path such that the male closure strip 30 is sealed to the other longitudinal edge of the base film web 41 when the melted flange portion 34 of the male closure strip 30, the melted binder layer 28b and the melted portion of the bag film web 41 cool.

For example, the apparatus 40 can seal a polyethylene female closure strip 20 having a flange portion 24 with a thickness of about 0.190 mm to a polyethylene bag film web 41 having a thickness of about 0.076 mm with a polyethylene binder layer 28a having a thickness of about 0.063 mm and a width (as measured in a direction extending from the bottom edge 17 of the bag 10 toward the zipper 21) of about 3.81 mm. Because the dimensions of the polyethylene binder layer 28a are small compared to the dimensions of the flange portion 24 of the female closure strip 20 and the dimensions of the melted portion of the bag film web 41, the melted polyethylene binder layer 28a cools quickly. For instance, at bag film web speeds of 200 feet per minute, the melted polyethylene binder layer 28a drops below the melt temperature within 10 inches of the squeeze point between the lay on roller 43 and the lamination roller 44. This corresponds to about 0.25 seconds.

The lamination apparatus 40 and associated lamination methods provide advantages over prior approaches to attaching closure members to a plastic film web prior to forming reclosable plastic storage bags. For example, the lamination apparatus 40 and methods introduce less tension differences across the film web compared to "hot shoe" lamination methods where the film web and closure members are pulled between two hot shoes. In addition, the lamination apparatus 40 and methods result in more consistent film web tracking thereby improving consistency of the seal between the closure members 20,30 and the film web 41.

Figure 5:
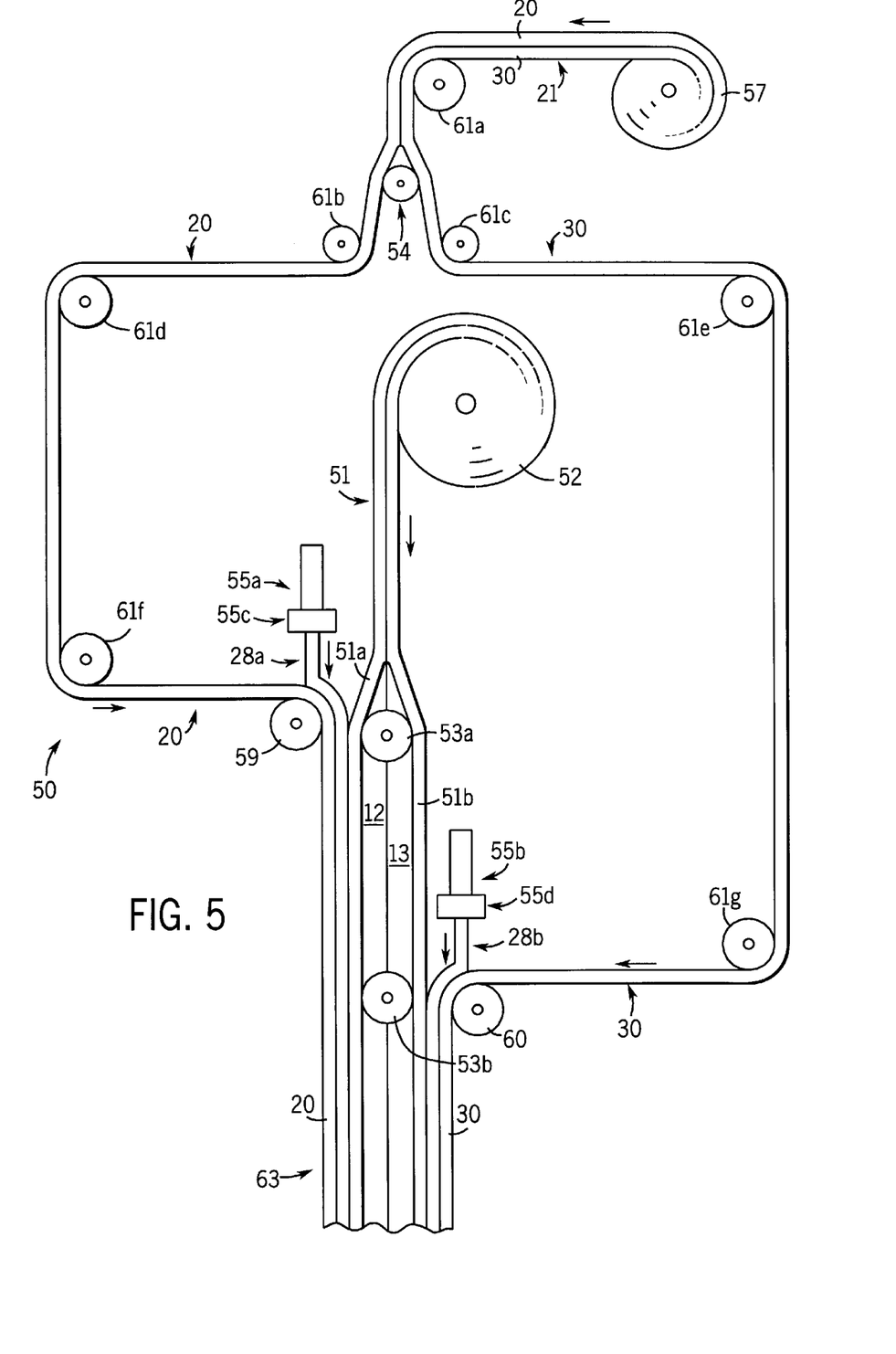
FIG. 5 is a side view of an alternative apparatus in accordance with the invention.

FIG. 5 shows an alternative lamination apparatus 50 to obtain a folded film 63 with a female closure strip 20 and a male closure strip 30 at opposite edges of a folded film web 51, the lamination apparatus 50 includes: a folded film supply roll 52 for supplying a folded film web 51 wound in a roll; a zipper supply roll 57 for supplying a zipper 21 comprising joined female closure strip 20 and male closure strip 30; a separation shift 54 for separating the female closure strip 20 and the male closure strip 30 after the zipper 21 is fed from the zipper supply roll 57; a binder layer extruder 55a with a die block 55c for supplying binder layer 28a; a binder layer extruder 55b with a die block 55d for supplying binder layer 28b; a female closure strip lamination roller 53a and a female closure strip lay on roller 59 for squeezing binder layer 28a between one edge 51a of the folded film web 51 and the inner surface 26 of the flange portion 24 of the female closure strip 20; and a male closure strip lamination roller 53b and a male closure strip lay on roller 60 for squeezing binder layer 28b between an opposite edge 51b of the folded film web 51 and the inner surface 36 of the flange portion 34 of the male closure strip 30.

The folded film web 51 is prefabricated using known techniques, such as extrusion and subsequent film folding, and is rolled up for storage on the folded film web supply roll 52. The female closure strip 20 and the male closure strip 30 are also prefabricated using known techniques such as extrusion and are joined and rolled up for storage on the zipper supply roll 57.

The folded film web 51 is then fed at a temperature that is below the melting temperature of the folded film web 51 (typically room temperature) from the folded film web supply roll 52 and at the same time, the zipper 21 is fed at a temperature that is below the melting temperature of the zipper 21 (typically room temperature) from the zipper supply roll 57. The zipper 21 is fed around stabilizing guide roller 61a into the separation shaft 54 to uncouple the female closure strip 20 and the male closure strip 30. After uncoupling, the female closure strip 20 and the male closure strip 30 are processed separately.

The female closure strip 20 wraps stabilizing guide rollers 61b, 61d and 61f and then wraps the female closure strip lay on roller 59. The binder layer extruder 55a is positioned in the lamination apparatus 50 such that binder layer 28a is placed on the inner surface 26 of the flange portion 24 of the female closure strip 20 just prior to the female closure strip 20 and the edge 51a of the folded film web 51 being squeezed between the female closure strip lay on roller 59 and the female closure strip lamination roller 53a, which also serves to open one end of the folded film web 51.

The binder layer 28a transfers enough heat to the inner surface 26 of the flange portion 24 of the female closure strip 20 and the edge 51a of the folded film web 51 to melt the flange portion 24 of the female closure strip 20 and the edge 51a of the folded film web 51. Pressure applied by the female closure strip lay on roller 59 and the female closure strip lamination roller 53a keeps the melted flange portion 24 of the female closure strip 20 in contact with the melted binder layer 28a and keeps the melted portion of the folded film web 51 in contact with the melted binder layer 28a at that point in the web path such that the female closure strip 20 is sealed to edge 51a of the folded film web 51 when the melted flange portion 24 of the female closure strip 20, the melted binder layer 28a and the melted portion of the folded film web 51 cool.

The male closure strip 30 wraps stabilizing guide rollers 61c, 61e, 61g and then wraps the male closure strip lay on roller 60. The binder layer extruder 55b is positioned in the lamination apparatus 50 such that binder layer 28b is placed on the inner surface 36 of the flange portion 34 of the male closure strip 30 just prior to the male closure strip 30 and the edge 51b of the folded film web 51 being squeezed between the male closure strip lay on roller 60 and the male closure strip lamination roller 53b. The binder layer 28b transfers enough heat to the inner surface 36 of the flange portion 34 of the male closure strip 30 and the edge 51b of the folded film web 51 to melt the flange portion 34 of the male closure strip 30 and the edge 51b of the folded film web 51.

Pressure applied by the male closure strip lay on roller 60 and the male closure strip lamination roller 53b keeps the melted flange portion 34 of the male closure strip 30 in contact with the melted binder layer 28b and keeps the melted portion of the folded film web 51 in contact with the melted binder layer 28b at that point in the web path such that the male closure strip 30 is sealed to edge 51b of the folded film web 51 when the melted flange portion 34 of the male closure strip 30, the melted binder layer 28b and the melted portion of the folded film web 51 cool. At folded film web speeds of 100 feet/minute, the lamination apparatus 50 produces a folded film 63 with good lamination of the female closure strip 20 and the male closure strip 30 to the folded film web 51 and with no tack of the film layers.

In the version of the lamination apparatus 50 shown in FIG. 5, the female closure strip 20 is sealed to the folded film web 51 before the male closure strip 30 is sealed to the folded film web 51. Of course, the lamination apparatus 50 also works well if configured such that the male closure strip 30 is sealed to the folded film web 51 before the female closure strip 20 is sealed to the folded film web 51. After processing in the lamination apparatus 50, the folded film web 51 exits as folded film 63 with female closure strip 20 and male closure strip 30 at opposite top edges and adjacent to each other. The side edges 15,16 and the bottom edge 17 of the reclosable bag 10 shown in FIG. 1 may then be formed by heat sealing as is well known in the art.

Thus, it can be seen that there is provided a method and apparatus for attaching prefabricated thermoplastic closure members to a prefabricated thermoplastic film web. The method and apparatus introduce less tension differences across the film web compared to "hot shoe" lamination, and improve the consistency of the seal between the closure members and the film web compared to prior methods.

The preceding description is merely of preferred embodiments of the invention. The claims should be looked to in order to understand the full scope of the invention.

INDUSTRIAL APPLICABILITY

Methods are disclosed for attaching closure elements such as zipper halves to thermoplastic film webs, particularly those used in forming reclosable plastic storage bags.

We claim:

1. A method for forming a thermoplastic film having a closure strip, the method comprising the steps of:
   (a) providing a thermoplastic film web having a sealing surface, the temperature of the film web being below a melting temperature of the film web;
   (b) providing a thermoplastic closure strip having a female closure strip having a first flange portion and a first closure clement and a male closure strip having a second flange portion and a second closure element, the temperature of the closure strips being below a melting temperature of the closure strips;
   (c) extruding first and second thermoplastic binder layers;
   (d) positioning the first binder layer between the sealing surface of the film web and an inner surface of only the first flange portion of the female closure strip and the second binder layer between the sealing surface of the film web and an inner surface of only the second flange portion of the male closure strip at locations remote from the first and second closure elements such that the binder layers contact the sealing surface of the film web before the binder layers have cooled to a temperature below the melting temperature of the film web and the binder layers contact the flange portions of the closure strips before the binder layers have cooled to a temperature below the melting temperature of the closure strips; and (e) thereafter applying pressure to the film web and the closure strips so as to bind the closure strips and film web to the binder layers.

2. The method of claim 1, wherein the film web has a thickness of between 0.0025 and 0.025 cm.

3. The method of claim 1, wherein the binder layers have a thickness of between 0.0025 cm and 0.015 cm.

4. A method for forming a thermoplastic film having a closure strip, the method comprising the steps of:

(a) providing a first cylindrical roller having a surface and an axis of rotation and a second cylindrical roller having a surface and an axis of rotation, the axis of the first roller and the axis of the second roller being substantially coplanar, the first roller and the second roller being aligned in spaced apart relationship such that a pinch area is formed between the surface of the first roller and the surface of the second roller;

(b) feeding a continuous length of a thermoplastic film web having a sealing surface, such that the film web wraps on the surface of the first roller, while the temperature of the film web is below a melting temperature of the film web;

(c) feeding a continuous length of a thermoplastic closure strip having a female closure strip having a first flange portion and a first closure element and a male closure strip having a second flange portion and a second closure element such that each closure strip wraps on the surface of the second roller, while the temperature of the closure strips is below a melting temperature of the closure strips;

(d) extruding first and second thermoplastic binder layers; and (e) positioning the first binder layer between the sealing surface of the film web and an inner surface of only the first flange portion of the female closure strip and the second binder layer between the sealing surface of the film web and an inner surface of only the second flange portion of the male closure strip; and (f) feeding the film web, binder layers and closure strips through the pinch area such that the binder layers contact the sealing surface of the film web before the binder layers have cooled to a temperature below the melting temperature of the film web and the binder layers otherwise contact only the flange portions of the closure strips at a location remote from each closure element before the binder layers have cooled to a temperature below the melting temperature of the closure strips.

5. The method of claim 4, wherein:

step (e) comprises applying the binder layers to each flange portion of each respective closure strip before the closure strips reach the pinch area; and step (f) comprises feeding the film web and the closure strips through the pinch area to create pressure on the film web and the closure strips.

* * * * *

UNITED STATES PATENT AND TRADEMARK OFFICE
CERTIFICATE OF CORRECTION

| | |
|---|---|
| PATENT NO. | : 6,562,165 B1 |
| APPLICATION NO. | : 09/640402 |
| DATED | : May 13, 2003 |
| INVENTOR(S) | : Karl W. Bauman and James C. Pawloski |

It is certified that error appears in the above-identified patent and that said Letters Patent is hereby corrected as shown below:

Column 12: Line 11, replace "(c)" with --(e)--

Column 12: Line 14, replace "scaling" with --sealing--

Signed and Sealed this

Twenty-sixth Day of August, 2008

JON W. DUDAS
*Director of the United States Patent and Trademark Office*